Dec. 29, 1959 A. ROSSI 2,918,715
APPARATUS FOR MANUFACTURING CERAMIC TILES
Filed Aug. 24, 1954 6 Sheets-Sheet 1
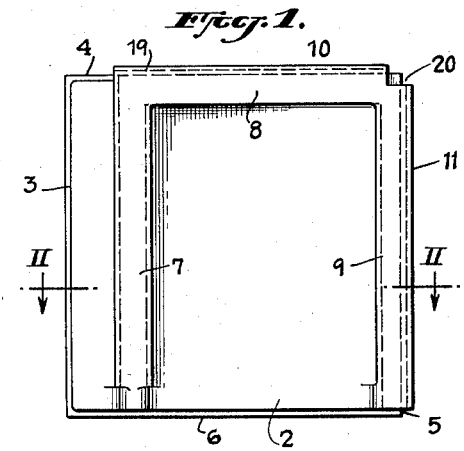
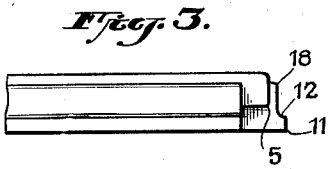
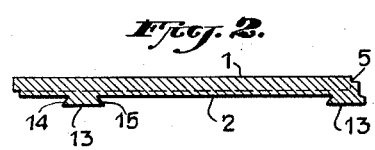
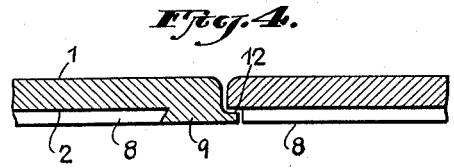
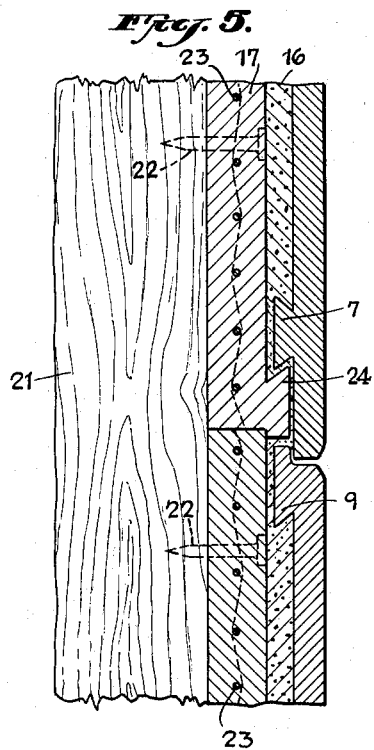
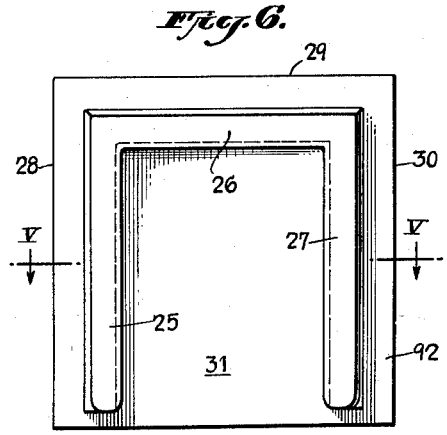
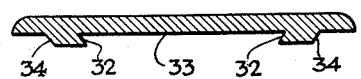
INVENTOR.
AUGUST ROSSI.
BY Ward, Crosby & Neal
ATTORNEYS.

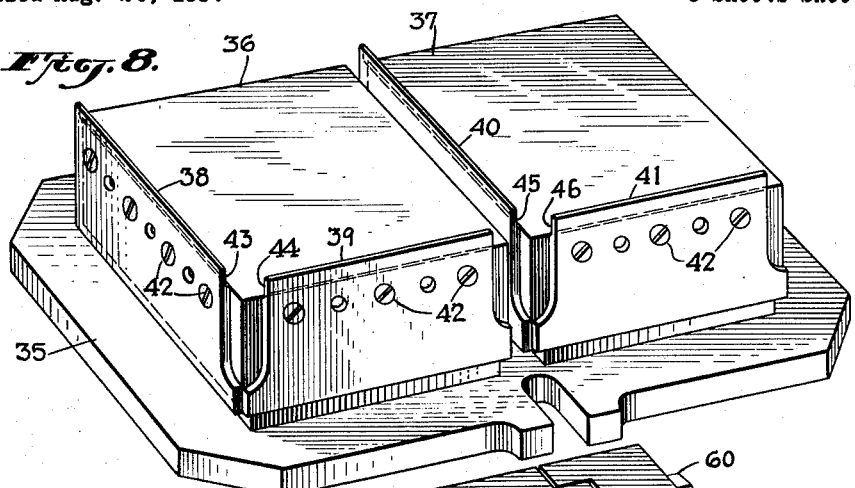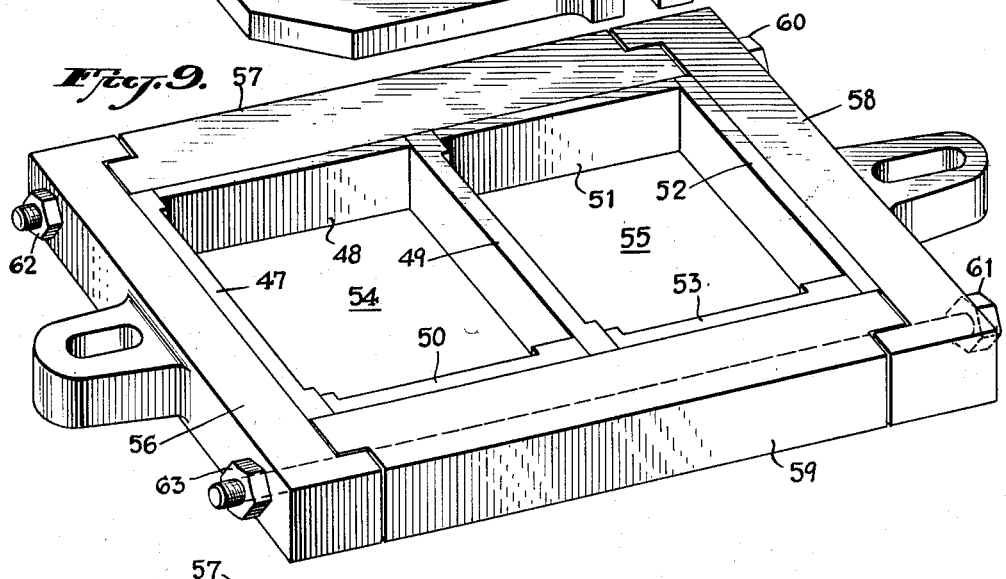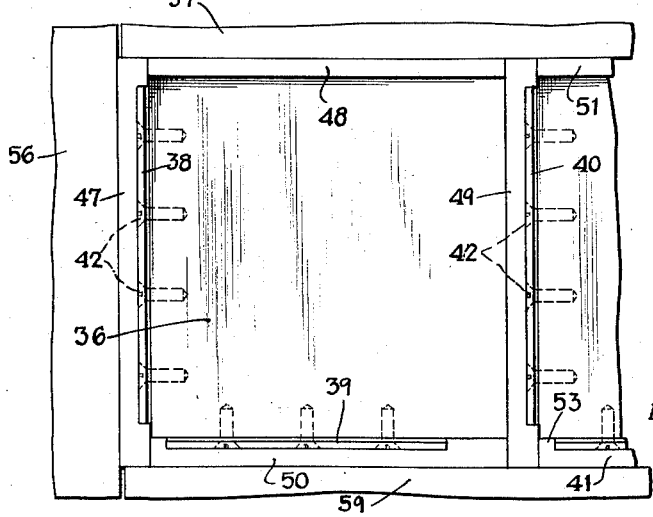

Dec. 29, 1959 A. ROSSI 2,918,715
APPARATUS FOR MANUFACTURING CERAMIC TILES
Filed Aug. 24, 1954 6 Sheets-Sheet 3
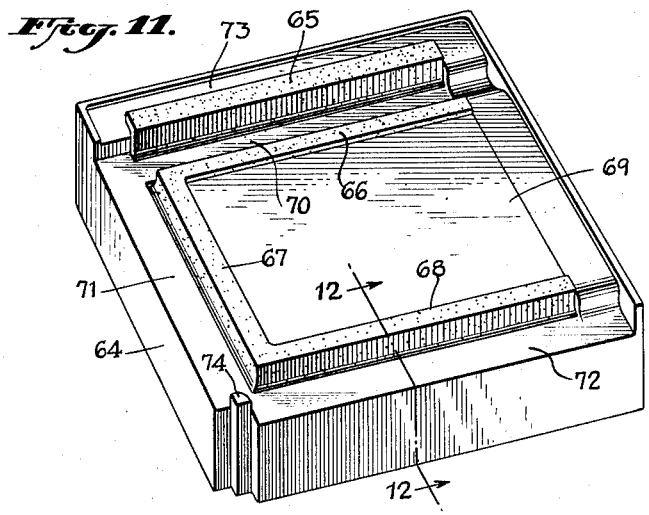
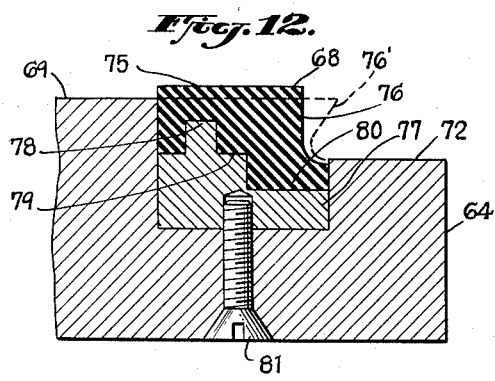
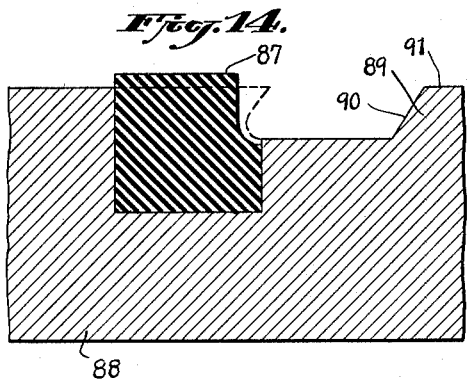
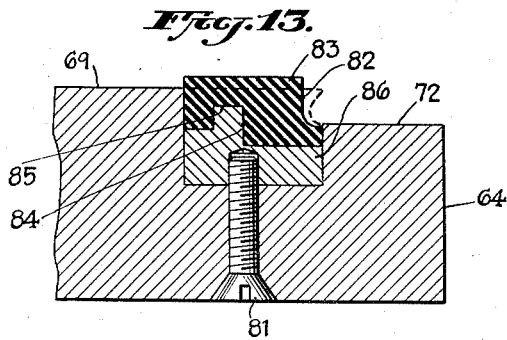
INVENTOR.
AUGUST ROSSI.
BY Ward, Crosby & Neal
ATTORNEYS.

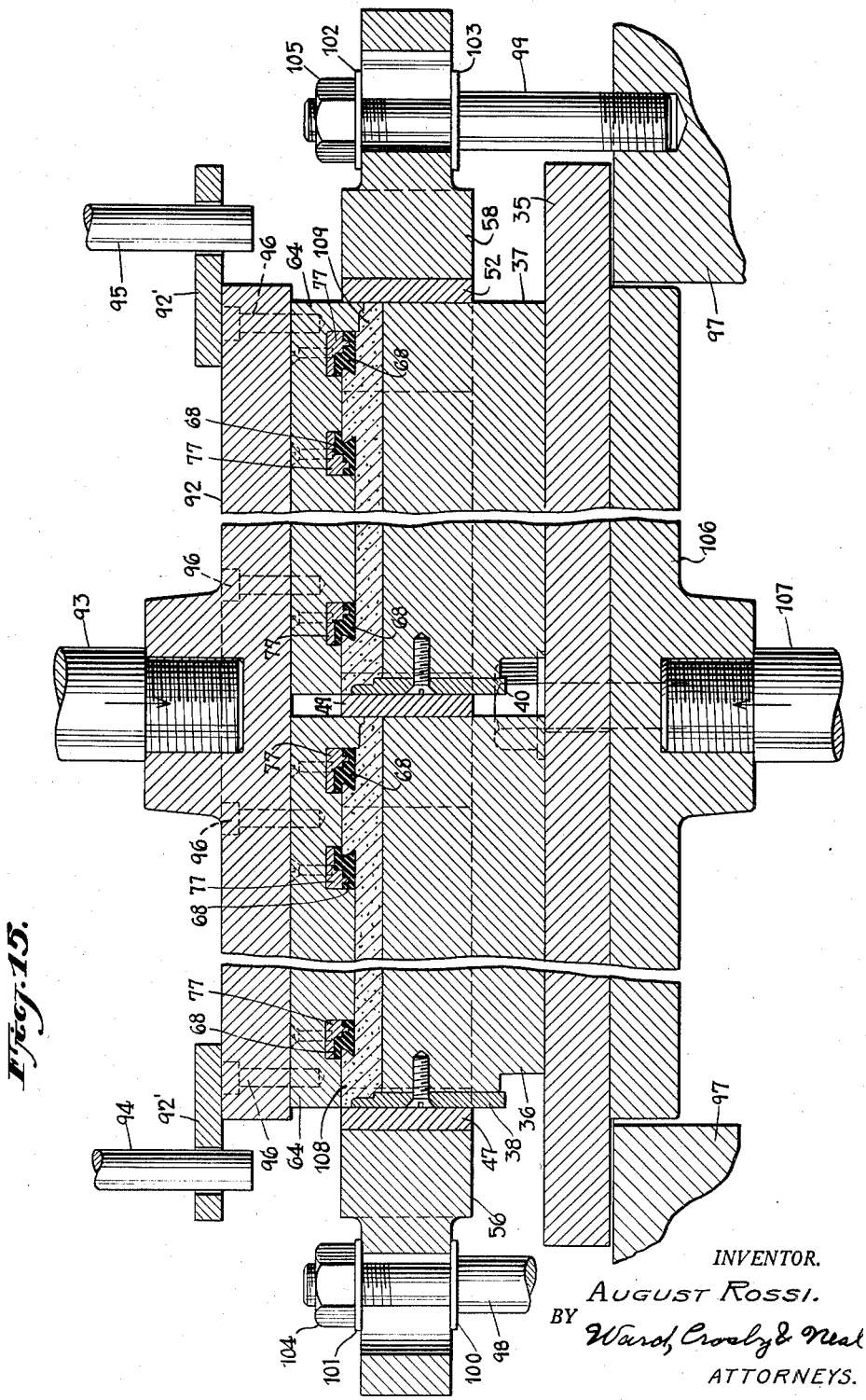

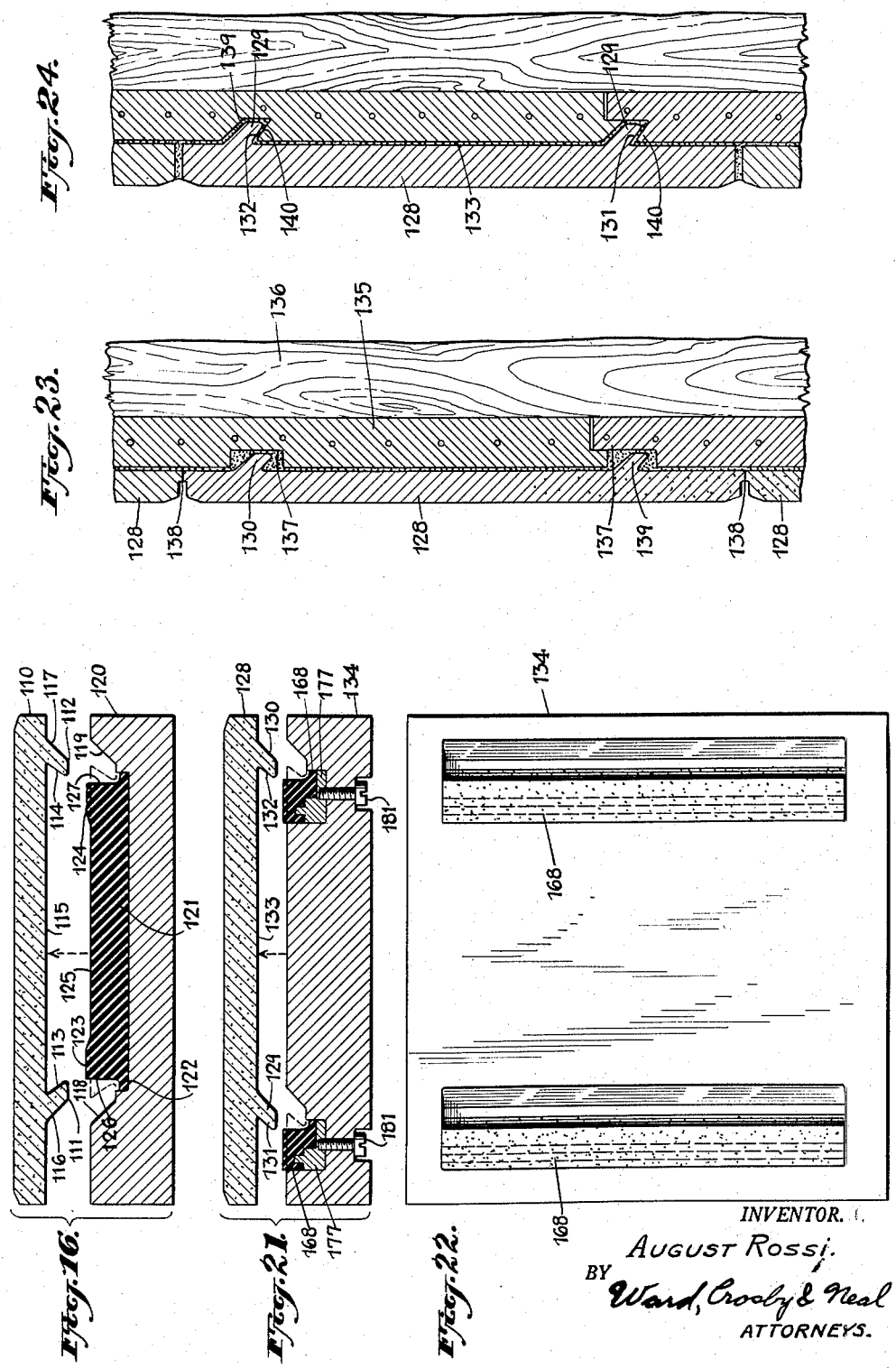

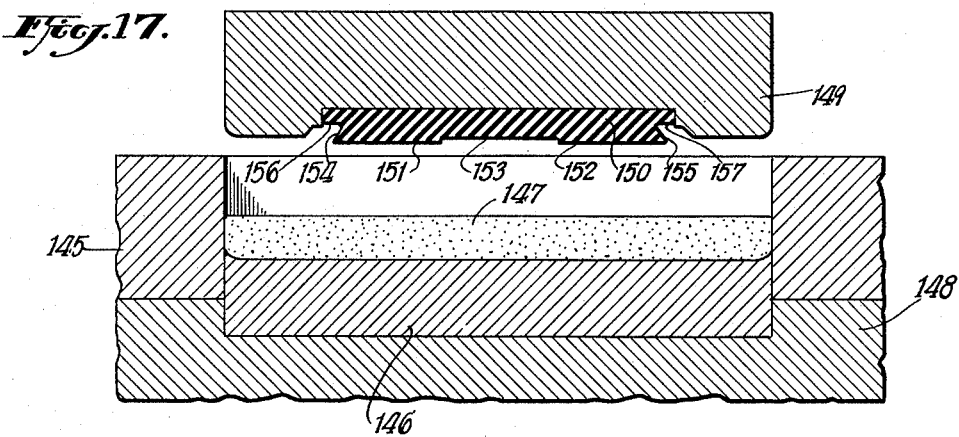
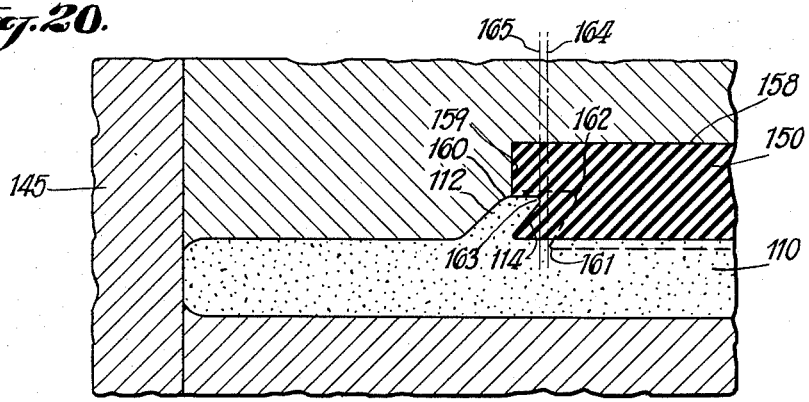
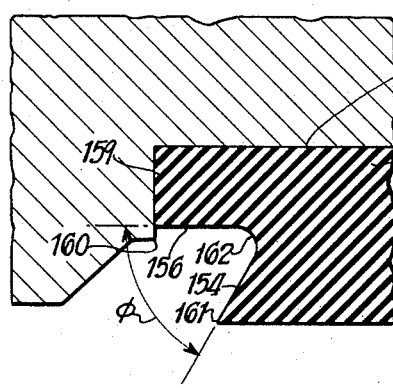
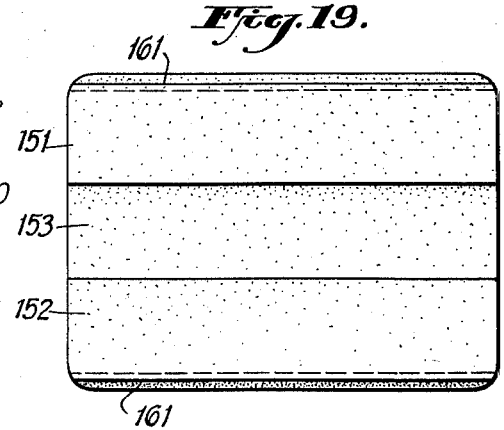

ated Dec. 29, 1959

United States Patent Office

2,918,715

APPARATUS FOR MANUFACTURING CERAMIC TILES

August Rossi, Astoria, N.Y.

Application August 24, 1954, Serial No. 451,821

6 Claims. (Cl. 25—122)

The present invention relates to improvements in apparatus for manufacturing ceramic tiles and relates particularly to tiles employed to cover walls, ceilings, etc.

There are two principal methods in use today for the installation of thin ceramic tiles on walls, ceilings, etc., and these methods are known as the floating method and the buttering method. In the floating method a flat surfaced layer of cement mortar is prepared, such as on a wall, and a skim coat of neat cement is applied on the back of each tile before it is set on the cement mortar bed or in some cases, in order to save time, the skim coat of neat cement is spread on the cement mortar layer and the tiles are set in place on the skim coat.

In the buttering method a layer of cement mortar is prepared as in the floating method and a skim coat of neat cement is first applied to the back of each tile and subsequently the back of the tile is buttered with cement mortar. The coated and buttered tile is then set in place on the layer of cement mortar. In some instances, to save installation cost, the butter coat of cement mortar is applied to the back of the tile without an intervening skim coat of neat cement.

The tiles are held on the layer of cement mortar by an adhesive bond between the back of the tile and the cement mortar. Prior to application of the cement mortar or skim coat of neat cement, the tiles must be soaked in water long enough so that they will not absorb sufficient moisture from the mortar to cause an imperfect bond.

If there is insufficient moisture in the tiles or in the cement mortar, if the skim coat is too great in thickness, i.e., over 1/16 of an inch thick, if the temperature is either too hot or too cold during the installation of the tiles or if the porosity of the tile is unsatisfactory due to patches of glaze on the back of the tile or improper molding or manufacture of the tile, the bond between the tile and the cement mortar is deleteriously affected and in the course of a relatively short period of time the tiles may loosen or fall off. The bond must be particularly good when the tiles are installed in places where they are subject to vibration or where it may be necessary to remove portions of the tile subsequent to installation, for example, when it is necessary to gain access to plumbing or other equipment.

It has heretofore been suggested that tiles should be provided with projections or lugs on the backs thereof which would provide a good mechanical bond between the tile and the surface on which the tile is set and so as to prevent loosening of the tile even though good adhesive bond is not obtained between the surface and the tile. It will be understood, however, that such projections or lugs will not provide an adequate mechanical bond if the surfaces of the sides of the projections or lugs are perpendicular to the inner face of the tile and do not form acute angles with the inner face of the tile. To form the required mechanical bond the shapes of the projections or lugs should be those of a dove tail, inverted cone or pyramid, etc. It has also been known heretofore to attempt to form such lugs by means of a sheet or pad of rubber having perforations therein in the shape of the lugs, the sheet being attached to a section of a pressing die.

Ceramic tiles are ordinarily formed by the use of a die in conjunction with a press, the die having at least two sections. One section of the die usually is in the shape of a shallow rectangular box and another section of the die fits within the box and compresses the clay or other material which is inserted into the box. Before the interengaging section of the die is inserted into the box-like section, the box-like section is filled with a predetermined amount of clay or other material and, when the tile is of uniform thickness throughout, the material used to form the tile is compressed substantially uniformly throughout the tile. Thus, the tile is of uniform density, porosity and strength and will not only have substantially the same adhesive bonding properties throughout the back surface, but also will provide a uniform front surface to which the glaze is applied. If the compression of the material is not uniform, all of these characteristics are affected and such tiles are not completely satisfactory. If the interengaging section of the die has an uneven surface or projections thereon for the purpose of producing ribs or lugs on the back of the tile, it will be seen that the portions of the material forming the ribs or lugs are not compressed to the same extent as the portions of the material intermediate the ribs or lugs. Thus, the ribs or lugs are softer than the remaining portions of the tile, are more readily chipped and have different bonding properties, and the appearance of the front surface of the tile at the portions thereof overlying the lugs or ribs is different from that of the remaining portions of the tile.

Tiles produced by the aforementioned dies having a perforated rubber sheet or pad therein have been subject to the aforementioned defects. It has been found that it is not possible to overcome these difficulties by dies with moving parts because the tile-forming material infiltrates the gaps between the parts and clogs the parts of the die in a short period of time, causing the production of imperfect tiles and requiring cleaning of the dies after only a short period of use. Also, the dies employing a perforated rubber sheet or pad are useful only in conjunction with materials which are relatively moist or plastic during the forming stage.

Materials which may be used for the forming of the tiles and which are relatively moist and plastic are not satisfactory for use under present-day standards because of shrinking, warping and cracking which is encountered during baking of the tile, and in general the industry today uses relatively dry materials which are difficult to form, such as the materials disclosed in United States Patent No. 1,628,910. Thus, apparatus of the type described above has been found to be unsatisfactory for the production of tiles with present-day materials not only because of the inability to obtain the necessary uniformity throughout the tile, but also because the stiffness of the material prevents the formation of ribs or lugs with the cross section necessary for the production of good mechanical bonds between the backs of the tiles and the supporting surface.

In accordance with my invention, I provide tiles formed from relatively dry and non-plastic materials and having projections or ribs of a configuration particularly adapted to provide a good mechanical bond between the tile and its supporting surface. Also, in accordance with my invetnion, I provide apparatus for forming such tiles with relatively uniform characteristics throughout all parts of the tile including the projections or ribs thereon. Such apparatus permits the tiles to be produced rapidly and economically and the resulting tiles are easy to install and will remain in place under conditions wherein other types of tiles are unsatisfactory.

One object of the invention is to provide a ceramic tile having ribs on the inner surfaces of the tiles so that when mortar sets in the ribs it will support the tile with a firm grip, and these ribs are preferably of a dove-tail configuration in transverse section.

Another object of the invention is to provide a tile of the above-mentioned type having two adjacent projecting borders of a thickness less than the thickness of the remainder of the tile which will maintain adjacent tiles at a predetermined distance from each other and which will provide a crevice between the tiles which can be filled in with appropriate material, such as mortar.

Another object of the invention is to provide a tile with a flange on at least two adjacent borders which may be used to overlap the borders of adjacent tiles in such a way that single tile cannot become detached without disturbing an adjacent tile.

Another object of the invention is to provide a rapid and practical system of covering the studs of walls under construction by slabs of a material which may be nailed to the studs and which may be sawed. These slabs have recesses formed therein which cooperate with the ribs on the tiles constructed in accordance with my invention to permit the tiles to be installed rapidly and correctly and which aids in preventing the tile from becoming detached. The tiles are fixed to the slabs with mortar or other cementitious material.

Other objects and advantages of the invention will be apparent from a consideration of the following detailed description of the preferred embodiments of the invention and setting forth the manner in which I now prefer to practice the invention and the accompanying drawings, in which:

Fig. 1 is a plan view of the inner face of a tile constructed in accordance with the preferred embodiment of my invention;

Fig. 2 is a cross-sectional view of the embodiment shown in Fig. 1 and is taken along the line II—II indicated in Fig. 1;

Fig. 3 is a fragmentary, cross-sectional view of the embodiment shown in Fig. 1 and taken along the line III—III indicated in Fig. 1;

Fig. 4 is a fragmentary, cross-sectional view of portions of a pair of tiles of the type shown in Figs. 1-3 mounted adjacent each other;

Fig. 5 is a side elevation, cross-sectional view illustrating one method of installing the tiles of the type shown in Figs. 1-3;

Fig. 6 is a plan view of the inner face of a modified embodiment of my invention;

Fig. 7 is a cross-sectional view of the embodiment shown in Fig. 6 and is taken along the line V—V indicated in Fig. 6;

Fig. 8 is a perspective view of a section of a die constructed in accordance with my invention and employed to form the tile shown in Figs. 1-3;

Fig. 9 is a perspective view of another section of the die employed to form the tile shown in Figs. 1-3;

Fig. 10 is a fragmentary, plan view of the die section shown in Fig. 8 assembled with the die section shown in Fig. 9;

Fig. 11 is a perspective view of a further portion of the die employed to form the tile shown in Figs. 1-3;

Fig. 12 is a fragmentary, cross-sectional view of a portion of the die section shown in Fig. 11 and is taken along the line 12—12 indicated in Fig. 11;

Figs. 13 and 14 are fragmentary, cross-sectional views of alternative constructions of the portion of the die shown in Fig. 12;

Fig. 15 is a fragmentary, side elevation view illustrating the assembly of the die shown in Figs. 8-11 and a portion of a press employed with the assembled die;

Fig. 16 is a cross-sectional, side elevation view of a modified tile construction and a die section employed for the forming of the modified tile;

Fig. 17 is a cross-sectional, fragmentary, side elevation view of modified die apparatus which may be employed for forming the modified tile shown in Fig. 16;

Fig. 18 is an enlarged, fragmentary, cross-sectional view of a portion of the top die section shown in Fig. 17;

Fig. 19 is a plan view of the rubber insert forming part of the top die section shown in Figs. 17 and 18;

Fig. 20 is an enlarged, fragmentary, cross-sectional view of a portion of the apparatus shown in Fig. 17;

Fig. 21 is a cross-sectional, side elevation view of a modified tile construction and a die section employed for the forming of the modified tile;

Fig. 22 is a plan view of the die section shown in Fig. 21; and

Figs. 23 and 24 illustrate the tile of Fig. 21 installed on supporting surfaces in accordance with my invention.

Although the apparatus and methods of my invention may be employed with any of the argillous materials commonly used to manufacture clay or ceramic tiles, it is particularly useful with the relatively non-plastic materials having a moisture content of about 6% or less which have been found to be preferable because there is substantially no shrinking, warping or cracking during the baking process of tiles formed from these latter materials. An example of a material of this type is disclosed in U.S. Patent No. 1,628,910.

Referring to Figs. 1-5, which illustrate the preferred embodiment of a tile of my invention and the method of installing such tiles, it will be seen that the tile has an outer smooth surface 1 generally enameled in a single color and an inner or rough surface 2 which is the face that contacts the adhesive material employed to secure the tile to a supporting surface, i.e., the surface of a wall. The edges of the tile are designated by the numerals 3, 4, 5 and 6, and three intersecting ribs 7, 8 and 9 project from the inner surface 2 of the tile. The edges of the ribs 7 and 9 are substantially parallel to each other and to the edges 3 and 5 of the main body portion of the tile, and the edges of the rib 8 are parallel to each other and to the edges 4 and 6. An edge 10 of the portion 8 is spaced outwardly from the side of the tile terminating in the edge 4, and the edge 11 of the portion 9 is spaced outwardly from the side of the tile terminating in the edge 5. These edges 10 and 11 form flanges, one of which is designated by the numeral 12, which, when the tiles are installed, lie under the adjacent edges of the adjacent tile, as is best shown in Figs. 4 and 5.

The configuration of the rib is best shown in Figs. 2, 4 and 5 and it will be seen from these figures that the rib has an inner face 13 and a pair of sides 14 and 15 whose surfaces form an acute angle with the inner face 2 of the body portion of the tile. Thus, when the tile is installed as indicated in Fig. 5 with cement or mortar 16 between the inner face 2 and the supporting layer 17, it will be seen that a mechanical bond is formed between the tile and the mortar because of the formation of rib and the flow of the mortar in between the sides of the rib and the inner face of the tile.

The tile is provided with intermediate stepped portions 18 and 19 between the edges 10 and 11 and the edges 4 and 5. These stepped portions strike against the adjacent edges of adjacent tiles and maintain a predetermined spacing between the adjacent edges which can be later filled with mortar, cement, or other suitable material. Such spacing is desirable so that the mortar, cement or other filling material will form a good bond with the tile and so that the spacing between adjacent tiles will be uniform.

The ribs 7 and 9 terminate at a short distance from the edge 6 and a portion 20 of the outer corner of the portions 8 and 9 is omitted so as to obtain uniform compression of the tile material at these points and thereby provide a uniform and strong tile.

The tiles shown in Figs. 4 and 5 are the same as the tile shown in Figs. 1–3 except for the omission of the intermediate spacing portions 18 and 19. The form of tile shown in these figures is particularly suitable for application to slabs or layers 17 mounted on wooden studs 21 by means of nails 22 or similar securing means. A particularly suitable composition for the slabs or layers 17 is prepared by mixing 70% by weight of a powdered mineral known as "vermiculite," 10% by weight of asbestos and 20% by weight of cement. The composition is mixed with water and formed in the shape of a slab by any suitable means with a wire mesh 23 embedded therein. The slab 17 is formed with dove-tail ribs 24 thereon which cooperate with the rib portion 7 to lock the tile in place and which assist in providing the proper alignment of the tiles.

A simpler and modified embodiment of the tile of my invention is shown in Figs. 6 and 7. In this embodiment the ribs 25, 26 and 27 are each spaced from the corresponding edges 28, 29 and 30 of the tile 31. As will be seen from Fig. 7, only one side 32 of the rib forms an acute angle with the inner face 33 of the tile 31, the opposite side 34 forming an obtuse angle with the inner face 33. This modified embodiment is simpler and more economical to manufacture than the embodiment shown in Figs. 1–3 because the flanges and spacing stepped portions have been omitted and because only one side of the rib must be formed at an acute angle with the inner face.

The tile illustrated in Figs. 1–3 may be manufactured two at a time by a die comprising the sections shown in Figs. 8–12. The die comprises a lower section shown in Fig. 8, an intermediate section shown in Fig. 9 and an upper section, a portion of which is shown in Fig. 11. The lower section shown in Fig. 8 is employed to form the external or enameled face of the tile and to form the intermediate stepped portions on the sides of the tile, the intermediate section shown in Fig. 9 is used to mold the sides of the tile and the upper section is employed to form the inner face of the tile and to form the rib or ribs thereon. Except for the portion of the section 11 which is used to form the ribs, the die is preferably formed of a hard, wear-resisting material, such as hardened tool steel.

The lower section of the die comprises a supporting plate 35 having a pair of blocks 36 and 37 mounted thereon in spaced relation to each other. The upper surfaces of the blocks 36 and 37 are highly polished so as to impart a smooth surface to the outer face of the tiles, and the upper surface of each block 36 and 37 has an area corresponding to that of the outer face of the tile. Thin plates 38, 39, 40 and 41 are attached to two sides of each block 36 and 37 by any suitable means, such as screws 42, so as to form the intermediate stepped portions and flanges on two sides of each tile. It will be noted that the plates 38–41 are stepped outwardly at the portions 43, 44, 45 and 46 which extend above the upper surfaces of the blocks 36 and 37, and these portions extend above the upper surfaces of the blocks 36 and 37 a distance slightly less than the thickness of the tile except for the ribs thereon. The upper surfaces of the plates 38–41 form the flanges, one of which is designated by the numeral 12 in Fig. 2, at two sides of the tile, and due to the fact that the flanges are compressed to a greater extent than other portions of the tile they will have a greater strength which is desirable to prevent chipping of the flanges during handling of the tile.

Referring to Fig. 9, the intermediate section of the die is composed of thick metal plates 47–53 arranged to form two identical apertures 54 and 55 and held firmly in position by interfitting peripheral bars 56, 57, 58 and 59 which are clamped together by means of bolts 60 and 61 and nuts 62 and 63 threaded thereon. The inner faces of the plates 47–53 are shaped in such a manner that the sides of the apertures 54 and 55 have an outline corresponding to the sides of the tile shown in Figs. 1–3. When the die is assembled, the plates 47–53 embrace the blocks 36 and 37 with the plates 38–41 thereon.

The upper section of the die comprises a pair of blocks of the type shown in Fig. 11 in an upside-down position for purposes of clarity in illustration. The block 64 shown in Fig. 11 has sides shaped so as to enter into the apertures 54 and 55 of the intermediate section and are made so as to provide a close fit therewith. The rib 7 is formed in the channel between the flexible members 65 and 66, the rib 8 is formed on one side by the flexible member 67 and the rib 9 is formed on one side by the member 68. A portion of the inner face of the tile is formed by the surface 69 and the inner faces 13 of the ribs are formed by the portions 70, 71 and 72. The portion of the inner face 2 between the rib 7 and the edge 3 is formed by the face of the member 65 and the portion 73. The cut-out portion 20 between the ribs 8 and 9 is formed by the projection 74.

The members 65–68 are formed from a flexible material which can withstand the temperature at which the die is operated (normally between 150 and 200° F.) and which has the necessary deforming properties. I have found that neoprene rubber of the type known as "75 durometer neoprene rubber Type A" sold by the B. F. Goodrich Company, New York, New York, has the elasticity and wearing properties necessary for a die constructed in accordance with my invention. Fig. 12 illustrates in cross section a portion of the die shown in Fig. 11 and indicates the construction of the members 65–68 which I have found suitable for use with relatively non-plastic materials which are satisfactory for the construction of non-shrinking and non-warping tiles. Fig. 12 illustrates member 68 in detail, but it will be understood that members 65–67 are similarly constructed. As shown in Fig. 12, the member 68 has an upper face 75 which normally is above and preferably, substantially parallel to the surface of the portion 69 immediately adjacent thereto. The member 68 also has a side 76 which in the uncompressed condition is relatively straight and which extends slightly below the surface of the portion 72 of the section, the surface of the portion 72 being substantially parallel to the surface of the portion 69. When the die is assembled as shown in Fig. 15 and when the section including the block 64 is pressed against the section shown in Fig. 8, the elastic, deformable member 68 is compressed into the shape indicated by the dotted line in Fig. 12. Thus, it will be seen that the side 76' forms the side 15 of the rib 9 at an acute angle with respect to the inner face 2. When the die is released and as the block 64 is withdrawn, the member 68 assumes its normal uncompressed shape and thereby permits the upper die section to be withdrawn without altering the configuration of the rib.

The shape of the member 68 in its compressed state is determined by the size of the member 68 and its elastic properties and by the shape of the non-elastic or rigid portion of the block 64 adjacent the member 68. Thus, I have found that by employing a member 77 in a channel in the block 64 various configurations of the member 68 in the compressed state may be obtained, depending upon the shape of the upper surface of the member 77. For example, I have found that with the aforementioned preferred tile materials the compressed shape shown by the dotted line in Fig. 12 may be obtained by providing the member 77 with the series of steps indicated at 78, 79 and 80, the surface of the step or die portion 80 being between the portions 69 and 72 and substantially parallel to the surfaces of the portions 69 and 72 and being at a level which is lower than the levels of the surfaces of the portions 69 and 72. With a rib face approximately ½-inch across and a rib height of approximately ⅛-inch above the inner face 2, the width of the member 68 in its normal or uncompressed state should be approximately ½-inch and the distance from the surface of the portion 72 to the surface of the portion 69 should be approximately ⅛-inch. The member 77 may be held in the channel in the block 64 by means of a screw 81. The step 78 also aids in providing a tight seal between the portion of the member 68 between the step 78 and the portion 69 and the adjacent side walls, and thereby aids in the preventing infiltration of the tile material between the member 68 and the block 64. The step 79 replaces yielding material in a zone of member 68 which controls the compressed shape of the side 76 and in conjunction with the other forces on the member 68 causes the side 76 to assume the shape indicated by the dotted line 76'.

When the member 68 is mounted on the block 64 as indicated in Fig. 12, I have found that it is unnecessary to cement the member 68 to the block 64 or to otherwise cause it to adhere to the block 64. The pressure applied to the member 68 during compression of the tile-forming material causes the member 68 to press against the walls of the channel or groove in the block 64 and prevents entrance of the material between the member 68 and the walls of the channel in the block 64, thereby preventing deformation of the member 68 during use of the die. Since the member 68 is not secured to the block 64, it may be removed readily from the block 64 and may be replaced quickly.

Construction of the die in the manner described above and illustrated in Figs. 11 and 12 has the additional advantage that compression of the member 68 during compression of the material forming the tile causes the member 68 to press sideways against the material forming the rib. Thus, the rib material is subject to vertical compression due to the pressing together of the die sections and to horizontal compression due to the deformation of the member 68. By suitably selecting the material employed for the member 68, the size of the member 68 and the shape of the member 77 or the portion of the block 64 into which the member 68 is inserted, the amount of pressure exerted on the material forming the rib may be adjusted, and hence the amount with which such material is compressed may be controlled. It has been found that in this manner the material forming the rib may be compressed at least as much as the remaining portions of the tile and, thus, the rib may have the same hardness, porosity and strength as the remainder of the tile.

Fig. 13 illustrates an alternative construction of the elastic member which may be employed in place of the construction shown in Fig. 12. In this construction a decreased amount of pressure on the rib material may be obtained during the tile-pressing process because there is a larger mass of the elastic material between the side 82 of the member 83 and the side 84 of the rigid step 85 forming part of the rigid member 86.

Fig. 14 illustrates an alternative construction of the elastic rib-forming member and also illustrates the formation of the associated portion of the die necessary for the molding of a tile of the type shown in Figs. 6 and 7. In the embodiment of Fig. 14, the members 77 and 86 have been eliminated entirely and the elastic member 87 depends for its control upon the size and shaping of the channel in the block 89 into which the member 87 is inserted. With a relatively large mass of elastic material forming the member 87, as shown in Fig. 14, the horizontal pressure on the rib material is smaller than it is with the construction shown in Figs. 12 and 13 and, also, the angle obtained with the side surface of the resulting rib will tend to be larger than the angle obtained with the construction shown in Figs. 12 and 13.

As mentioned above, Fig. 14 also shows a portion of the block construction which may be employed for the molding of a tile of the type shown in Figs. 6 and 7. Thus, the block 88 in Fig. 14 is provided with an upwardly extending portion 89 whose side surface 90 forms the side 34 of the tile shown in Figs. 6 and 7 and whose upper surface 91 forms the marginal portion 92 of the tile shown in Figs. 6 and 7.

It will be apparent from a consideration of the above that a pair of the members 68, 83 or 87 may be placed back to back with an intervening rigid member for the purpose of producing oppositely slanted side rib surfaces and such an arrangement will produce ribs having the configuration shown in Fig. 7.

Referring to Fig. 15, which illustrates the die sections described in connection with Figs. 8–12 in their pressing positions and in association with a press, it will be seen that the upper section comprising two of the blocks 64 may be mounted on a movable plate 92 which is secured to the press plunger 93 and which is guided by the guides 94 and 95 extending through apertures in extensions 92' of the plate 92. The blocks 64 may be secured to the plate 92 by any suitable means, such as screws 96.

The intermediate section of the die shown in Fig. 9 is mounted on a fixed support, such as the support 97, by means of studs 98 and 99, washers 100–103 and nuts 104 and 105 threaded on the studs 98 and 99, the washers 100 and 103 engaging shoulders on the studs 98 and 99.

The lower section of the die shown in Fig. 8 may also be mounted on a fixed support, but preferably it is mounted on a movable plate 106 secured to the press plunger 107 so that, after the tiles 108 and 109 are pressed and the upper section of the die has been raised, the tiles 108 and 109 may be pushed by the plunger 107 above the upper surface of the intermediate section of the die, thereby facilitating removal of the tiles 108 and 109 from the die.

Tiles which are less expensive to manufacture but having fewer features than the tiles shown in Figs. 1–3 may also be constructed in accordance with the invention. In Fig. 16, for example, I have shown a tile 110 having only two ribs 111 and 112. The ribs 111 and 112 have two oppositely-extending side surfaces 113 and 114 which form acute angles with the inner face 115 of the tile 110. The opposite side surfaces 116 and 117 of the ribs 111 and 112 form angles at least equal to 90° with the inner face 115 of the tile 110. Thus, the portions 118 and 119 of the block 120 which mold the side surfaces 116 and 117 may be made of rigid material in a conventional manner. A member 121 of resilient material, such as the neoprene rubber heretofore described, is inserted in a channel 122 in the block 120 and has a pair of end portions 123 and 124 which are raised above the intermediate upper surface 125. Thus, when the member 121 is compressed, the ends 126 and 127 thereof move outwardly to the positions shown in dotted lines and thus cause the formation of the side surfaces 113 and 114. The member 121 may, of course, be replaced by a pair of oppositely directed members 68 of the type shown in Fig. 12.

Fig. 17 illustrates the preferred die apparatus for forming the tile shown in Fig. 16 and apparatus of this type has been used for the making of over 500,000 tiles. The apparatus shown in Fig. 17 is preferred to that shown in Fig. 16 because of the improved control of the shaping and density of the ribs 111 and 112 which may be obtained with the apparatus shown in Fig. 17.

The apparatus shown in Fig. 17 comprises a center die section 145 having a rectangular cavity therein for receiving the lower die section 146 which forms the outer face of the tile and for receiving the material 147 from which the tile is formed. The center section 145 also forms the sides of the tile. The lower die section 146 is mounted on the press platen 148.

The upper die section or member 149, which is rigid and preferably is made of metal, has a rectangular cavity or recess in the lower face thereof for receiving an insert 150 which is made of rubber. The insert 150 is held in the cavity in the die section 149 merely by the friction of the sides of the insert 150 with the side walls of the recess in member 149, it being unnecessary to employ any adhesive to hold the insert in the recess in the die section 149. It is preferable that the insert 150 be so held so that it is a relatively simple matter to replace the insert 150 when it becomes worn. The die apparatus may, for example, be employed for the production of 48 tiles a minute and it usually is necessary under such conditions to replace the rubber insert approximately once a week.

Referring to Figs. 18–20, the insert 150 is specially formed so as to provide the desired configuration and density of the ribs 111 and 112. The insert 150 preferably is formed of neoprene having a Shore hardness of from 65 to 70. The insert 150 has a pair of end portions 151 and 152 whose surfaces are raised above the surface of the intermediate portion 153 so as to provide the necessary sidewise flow of the end portions 151 and 152 when the insert 150 is compressed during pressing of the tile material 147. The opposite sides of the insert 150 have notches therein with sidewalls 154, 156 and 155, 157 which intersect at an acute angle.

Referring to Fig. 18, the height of one side wall 156 of the notch in the side of the insert 150 which is substantially parallel to the back surface 158 of the insert 150 is less than the height of the adjacent side wall 159 of the recess in the die section 149. The purpose of so relating the distance of the side wall 156 from the back surface 158 with respect to the height of the side wall 159 is to prevent the insert 150 from overlapping the corner 160 of the die section 149 during compression of the tile material. Thus, as the insert 150 is compressed during pressing of the tile material, the rubber tends to flow upwardly toward the tile material as well as sidewise, and this is particularly true adjacent the side wall 159. If the insert 150 overlaps and extends around the corner 160, a certain amount of the tile material will be trapped by the overlapping portion and not only will undesirably wear the insert 150, but also will require stopping of the pressing apparatus after only a few operations to permit removal of the accumulated material. In addition, such trapped material will cause ragged ribs 111 and 112 and will prevent uniform compression of the tile material froming the ribs 111 and 112. The amount of difference between the distance of the side wall 156 from the back surface 158 and the height of the side wall 159 depends upon the characteristics of the rubber forming the insert 150 and the degree to which the tile material is compressed. However, with the preferred type of rubber described above, with the size of apparatus required for pressing a tile which is 4¼" square and with a total insert thickness of approximately ¼", the difference between said distance and said height should be approximately five to ten thousandths of an inch.

To provide a side surface 114 on the rib 112 of tile 110 having an angle with the back surface of the tile of approximately 70 degrees, the side surface or wall 154 should intersect the side wall 156 at an angle approximately equal to 75 degrees, the angle being most clearly shown at φ in Fig. 18, and, in addition, in order to prevent undesirable accumulation of tile material and ragged edges on the ribs 111 and 112 as aforesaid, the corner 161 of the insert 150 should be spaced from the bottom 162 of the notch formed by the side walls 154 and 156 in a predetermined manner. Thus, as shown in Fig. 20, the spacing of the corner 161 from the bottom 162 of the notch in a direction substantially parallel to the tile-engaging surface should be such that when the top die section 149 is raised after pressing the tile material to form the tile 110, the corner 161 clears the corner 163 of the rib 112. Accordingly, the spacing of the corner 161 from the bottom 162 in a direction substantially parallel to the tile-engaging surface of the insert 150 should be no greater than, and preferably is less than, the distance between the position of the bottom 162 in the uncompressed condition of the insert 150 and the position of the bottom 162 when the tile material and hence the insert 150 is fully compressed. Fig. 20 shows the shape of the insert 150 in its uncompressed state in dotted lines and shows the insert 150 in its compressed state in full lines and it will be seen that the corner 161 in the uncompressed state of the member 150 is positioned at the line 164, whereas the bottom 162 in the compressed state of the insert 150 is at the line 165. It will also be noted from Fig. 20 that in the compressed state of the insert 150 the side wall 156 of the notch is substantially at the same level as the corner 160 at the end of the side wall 159.

Fig. 21 illustrates an alternative arrangement of the ribs shown in Fig. 16 and the construction of the portion of the upper die section which may be employed for producing such ribs. In Fig. 21 the tile 128 has a pair of ribs 129 and 130 which have a pair of side surfaces 131 and 132 which form acute angles with the inner face 133 of the tile 128 and which are substantially parallel. Such ribs 129 and 130 may be formed by means of the block 134 having members 168 and 177 inserted in channels therein and held in place by screws 181.

Fig. 22 is a plan view of the portion of the upper die section shown in Fig. 21 and it will be apparent from this figure that the rib-forming members 68 extend substantially parallel to each other and only in a direction parallel to a pair of edges of the block 134, thus producing only a pair of parallel ribs on the tile 128.

Although the tile 128 shown in Fig. 21 is simpler in form and more economical to manufacture, it has been found to be highly satisfactory when applied in the conventional manner to a layer of cement mortar, and it can also be applied to slabs of the composition described in connection with Fig. 5. Thus, as shown in Fig. 23, slabs 135 of such composition may be secured to studs 136 such as by nails (not shown). The slabs 135 are provided wtih grooves 137 therein which are spaced apart a distance substantially equal to the distance between the ribs 130 and 129. Prior to the application of the tiles 128 to the surface of the slabs 135, the surface is coated wtih an adhesive and the grooves 137 are filled with such adhesive. When the adhesive has set, the ribs 129 and 130 form a mechanical as well as an adhesive bond with the adhesive in the grooves 137. The crevices 138 between the tiles 128 may be filled with cement or mortar after the tiles 128 have been put in place.

The construction shown in Fig. 24 differs from the construction in Fig. 23 in the shape of the grooves in the slabs 135. Thus, with the grooves 139 in the shape shown in Fig. 24, the tiles 128 are held on the surface of the slabs 135 by the portions 140 of the slabs which project into the space between the surfaces 131 and 132 of the ribs 129 and 130 and the inner face 133 of the tile 128.

It will be understood that my invention is not limited to ribs and tiles of the configurations described above, although such configurations have been found to be most satisfactory in accomplishing the objects of the invention. It will also be apparent that the disposition of the ribs on the inner face of the tile may be modified as desired and the ribs may have different configurations throughout their lengths. Also, if desired, the intermediate and lower sections of the die may be combined as a single section.

While the invention has been described with reference to the preferred forms thereof, it will be understood by those skilled in the art, after understanding the invention, that modifications and changes may be made therein without departing from the spirit and scope of the invention as defined by the claims appended hereto.

This application is a continuation-in-part of my copending application Serial No. 283,887, now abandoned, entitled "Ceramic Tiles and Manufacture Thereof," and filed April 23, 1952.

What is claimed as new and what I desire to secure by Letters Patent of the United States is:

1. A die for forming a tile having integral with its base, a projecting rib at least one side wall of which is acutely inclined to the base, said die comprising a mold of rigid material having a cavity for reception of an argillous charge and shaped to form the face and edge of said tile, a plunger of rigid material conforming to and displaceably received in said cavity and having a pressing face shaped to form the base of said tile, said plunger face having a recessed portion and means mounted in a portion thereof and forming in conjunction with the balance of said recessed portion, a slotted recess of the general configuration of said rib, said means including at least one elastic member outlining a side wall of said rib and projecting beyond the non-recessed face portion of said plunger, whereby upon forcing said plunger into said mold and into compressive engagement with said charge, said charge is forced and compacted into said slotted recess to form said rib while said elastic member is concurrently resiliently compressed substantially flush with the non-recessed portion of said plunger and an edge thereof laterally displaced into acutely inclined relation to said plunger face thereby to form said acutely inclined side wall of said rib, and whereby said elastic member thereafter resiliently disengages the so-formed side wall on withdrawal of said plunger from said mold.

2. A die according to claim 1 wherein the recessed portion of said plunger forms a shoulder outlining one sidewall of said rib and wherein said elastic member outlines the opposite sidewall thereof to form said slotted recess in which said rib is formed.

3. A die according to claim 1 for forming a tile having a projecting rib on its base, the opposite sidewalls of which are, respectively, obtusely and acutely inclined to the base, and wherein the recessed portion of said plunger forms a shoulder obtusely inclined to its face and outlining one sidewall of said rib and wherein said elastic member outlines the opposite sidewall thereof to form said slotted recess in which said rib is formed.

4. A die according to claim 1 wherein the recessed portion of said plunger forms a shoulder outlining one sidewall and the upper dege of said rib and wherein said elastic member is mounted in a slotted recess of said plunger substantially parallel to said shoulder and spaced therefrom substantially the width of said rib thereby to form in conjunction with said shoulder the slotted recess in which said rib is formed.

5. A die according to claim 1 wherein the recessed portion of said plunger is slotted to provide parallel sidewalls of a width exceeding said rib and of an intermediate height conforming thereto, and wherein a pair of elastic strips are mounted on said slot against said sidewalls respectively, the opposed strips being spaced substantially the width of said tile rib and projecting beyond the non-recessed face portion of said plunger, whereby upon forcing said plunger into said mold and into compressive engagement with said charge to form said tile, said charge is forced into the space between said elastic members and to the intermediate depth of said slot to form said tile rib, and whereby said elastic members are resiliently compressed substantially flush with the non-recessed face portion of said plunger and the edges thereof laterally displaced inwardly toward each other and into oppositely and acutely inclined relation to said plunger face thereby to form oppositely and acutely inclined sidewalls of said rib.

6. A die according to claim 1 for forming a tile having a pair of parallel projecting ribs on its base, a sidewall of each of which is acutely inclined to the base, and wherein the recessed portion of said plunger forms oppositely disposed shoulders outlining one sidewall of each said rib, and wherein said recessed portion of said plunger mounts an elastic member having its opposite edges spaced from and extending parallel to said shoulders respectively, thereby outlining the opposite sidewall of each said rib and forming with said sholuders slotted recesses in which said ribs are respectively formed with an edge acutely inclined to the tile base.

References Cited in the file of this patent

UNITED STATES PATENTS

| | | |
|---|---|---|
| 462,895 | Doulton | Nov. 10, 1891 |
| 2,132,257 | Duskey | Oct. 4, 1938 |
| 2,156,149 | Feichter | Apr. 25, 1939 |
| 2,513,785 | Browne | July 4, 1950 |
| 2,516,191 | Englesson | July 25, 1950 |
| 2,575,734 | Schulman | Nov. 20, 1951 |
| 2,593,456 | James | Apr. 22, 1952 |
| 2,619,702 | Blackburn | Dec. 2, 1952 |
| 2,627,641 | Steele et al. | Feb. 10, 1953 |
| 2,719,328 | Patton et al. | Oct. 4, 1955 |